(No Model.) 3 Sheets—Sheet 1.
F. A. WALSH.
MACHINE FOR WORKING SHEET METAL.
No. 492,076. Patented Feb. 21, 1893.
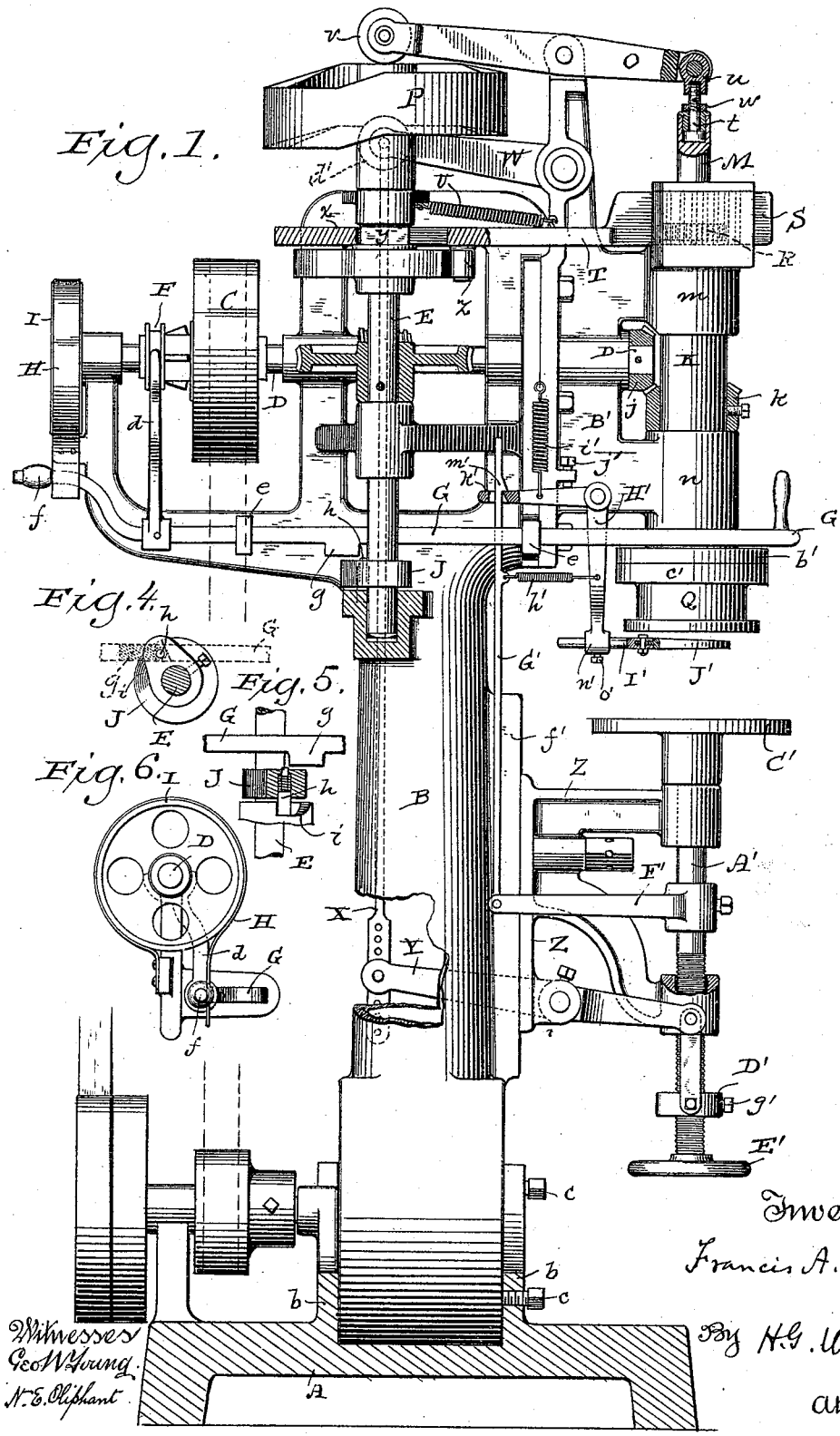
Witnesses
Geo. W. Young
N. E. Oliphant
Inventor
Francis A. Walsh
By H. G. Underwood
Attorney

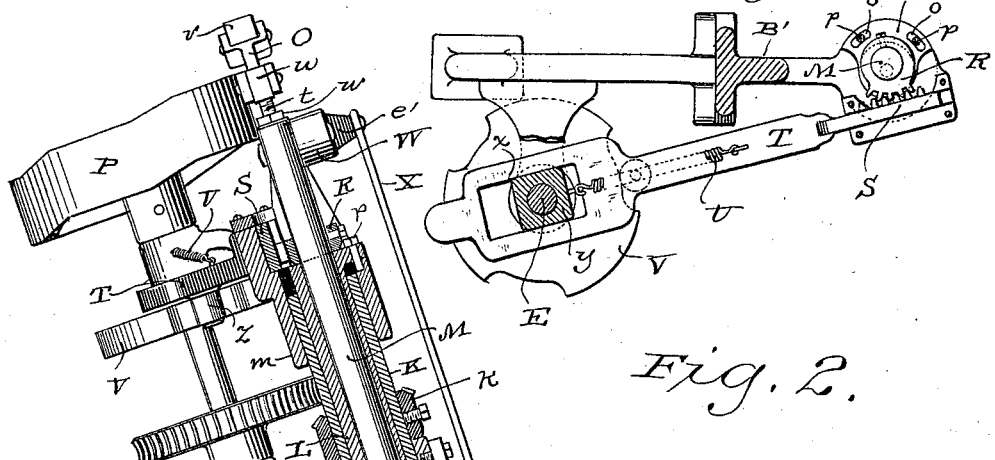

(No Model.) 3 Sheets—Sheet 3.
F. A. WALSH.
MACHINE FOR WORKING SHEET METAL.
No. 492,076. Patented Feb. 21, 1893.
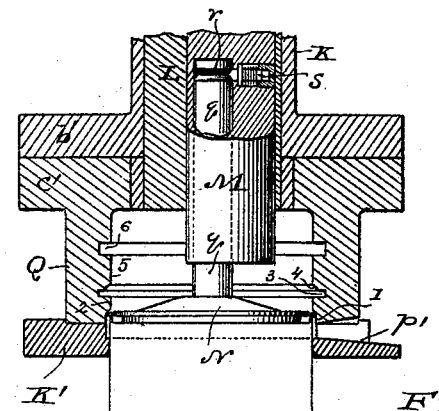
Fig. 8
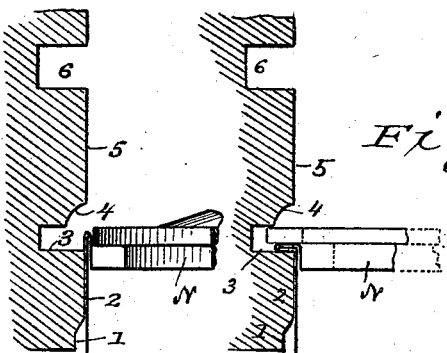
Fig. 9. Fig. 10.
Fig. 11.
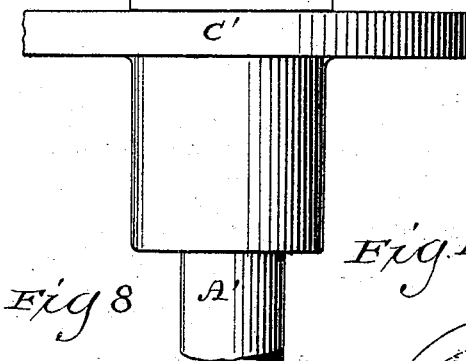
Fig. 13.
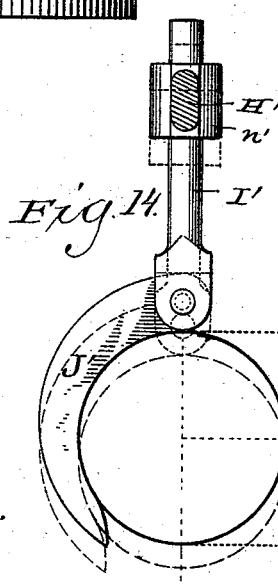
Fig. 14.
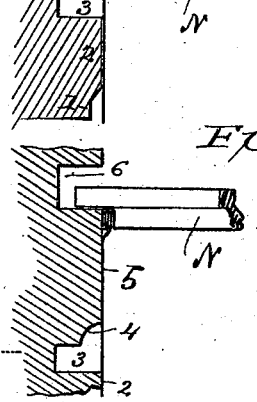
Fig. 12.
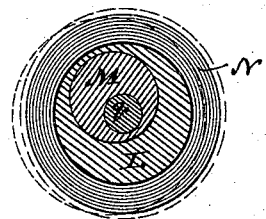
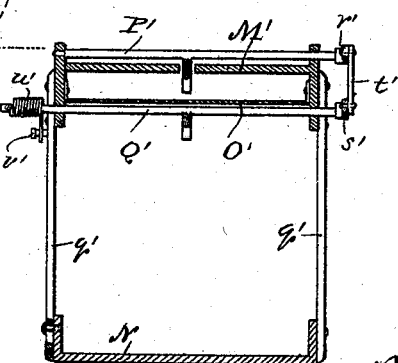
Fig. 15.
Witnesses
Geo. W. Young
N. E. Oliphant
Inventor
Francis A. Walsh
By H. G. Underwood
Attorney

UNITED STATES PATENT OFFICE.

FRANCIS A. WALSH, OF MILWAUKEE, WISCONSIN.

MACHINE FOR WORKING SHEET METAL.

SPECIFICATION forming part of Letters Patent No. 492,076, dated February 21, 1893.

Application filed April 10, 1890. Serial No. 347,322. (No model.)

*To all whom it may concern:*

Be it known that I, FRANCIS A. WALSH, of Milwaukee, in the county of Milwaukee, and in the State of Wisconsin, have invented certain new and useful Improvements in Machines for Working Sheet Metal; and I do hereby declare that the following is a full, clear, and exact description thereof.

My invention relates to machines for working sheet-metal; and it consists in certain peculiarities of construction and combination of parts to be hereinafter described with reference to the accompanying drawings and subsequently claimed.

In the drawings: Figure 1 represents a side elevation of a machine constructed according to my invention, certain of the parts being broken away, Fig. 2, a front elevation partly in section, Fig. 3, a detail plan view partly in horizontal section illustrating a rack and segment mechanism that forms part of the machine, Figs. 4 and 5, detail views of a cam and lever-mechanism that also forms part of the machine, Fig. 6, a detail elevation of a brake-mechanism employed in connection with said cam and lever-mechanism, Fig. 7, a plan view of a feed-plate that forms part of a seaming head shown in the present application, Fig. 8, a detail sectional view illustrating a chucking and seaming mechanism and sheet-metal vessel at the first stage of the operation, Figs. 9 to 12, inclusive, diagram views showing successive stages of the operation with relation to the formation of a double-seam, Fig. 13, a horizontal section illustrating an eccentric arrangement of certain of the parts, Fig. 14, a detail plan view of a device for centering and ejecting articles worked upon by the machine, and Fig. 15, a transverse section of a feeding-mechanism.

Referring by letters and numerals to the drawings A represents a base preferably provided with a circular socket $b$ for the correspondingly shaped lower end of an adjustable standard B, the latter being held in its adjusted position by means of set-screws $c$ passed through the sides of said socket. The base is also provided with bearings for a drive-shaft having a tight and loose-pulley for belt connection with a power shaft (not shown) and the drive-shaft is provided with another pulley or belt connection with a pulley C loose on a counter-shaft D, that has its bearings in arms on the standard B and a casting B' bolted to said standard. The standard B is also provided with bearings for another shaft E at right-angles to the one D, these latter shafts being connected by worm-gear, as is usual in the art to which my invention relates.

Arranged to slide on the counter-shaft D and revolve therewith is a clutch F for engagement with the hub of pulley C and this clutch is connected by a spanner $d$ with a starting-lever G, the latter being arranged to slide in guides $e$ on the standard B, the rear end of the lever being provided with a wedge $f$ that operates upon a spring brake H opposed to the periphery of a wheel I on said counter-shaft. The lever G is also provided with a lug, $g$, and when said lever is drawn out to cause an engagement of the clutch-mechanism and a release of the brake above described, the lug will be in the path of a spring-controlled pin $h$ carried by an arm J on the shaft E, said pin being automatically raised and lowered by its travel on a cam-track $i$, and as a matter of convenience, this cam-track is preferably formed on one of the bearings for said shaft.

By the construction and arrangement of parts just described it will be seen that when the shaft E completes a revolution, the clutch-mechanism is automatically disengaged and the brake set, whereby the revolution of shaft D is instantly stopped, the starting lever being returned to its normal position.

The front end of the counter-shaft D carries a pinion $j$ in mesh with a gear-wheel $k$ fast on a sleeve K that has its bearings in arms $m$, $n$, of the casting bolted to the standard B and incloses another sleeve L, the latter being flanged at its upper end and the flange provided with segmental slots $o$ for engagement with set-screws $p$, that in turn engage with the standard-arm $m$ whereby said latter sleeve is adjustably held in its working position. The sleeve L has an eccentric bore that forms the bearing for a spindle M, and this spindle has the lower end thereof provided with an eccentric-socket for the shank $q$ of a flanged tool N, said shank being provided with a beveled groove $r$ for engagement with the conical inner end of a spring-controlled pin $s$ arranged in the spindle M, whereby said tool is detachably secured in its working position, the throw of this tool being regulated by the adjustment of said sleeve.

The upper end of the spindle M is preferably connected to the head of a screw $t$ that engages a shackle $u$ connected to a lever O, the latter being fulcrumed to an arm of the casting B' and provided with a roulette $v$ opposed to the upper side of a cam-wheel P on the shaft E, said screw being held in its adjusted position by a check-nut $w$, the adjustment serving to raise or lower said spindle to thereby compensate for wear on the tool N, or to regulate the latter with reference to its engagement with dies formed in a hollow head Q, this head being hereinafter more fully described.

Fast on the upper portion of the spindle M is a toothed segment R in mesh with a rack S on the forward end of a lever T, the latter being provided with a rectangular slot $x$ that engages a squared guide $y$ preferably on a bearing for the shaft E, and a spiral-spring U connects the lever and bearing, the power of the spring acting to draw back on said lever. The lever T carries a roulette $z$ arranged to impinge against the periphery of a cam-wheel V on the shaft E, this cam-wheel being timed to move said lever at predetermined intervals against the power of the spring U, the latter operation communicating motion to the spindle M through the rack and segment gear above described. By means of the spring-controlled rack-gear and cam-mechanism, the tool N is brought in and out of its working position at predetermined intervals, the cam-wheel V being timed to suit the work to be done on the machine.

The sleeve K is provided with a flange $b'$ and bolted thereto is a flange $c'$ on the head Q, this head, as shown, being designed for the purpose of seaming ends onto vessel bodies, but as the machine, by means of interchangeable heads, is capable of doing various kinds of work on either curved or angular vessels, I do not wish to be understood as limiting myself to any particular form of head or tool.

The same arm of the casting B' that forms the fulcrum for the lever O also serves a similar purpose for a lever W, the latter being provided with a roulette $d'$ opposed to the lower side of the cam-wheel P on shaft E, and connected to an arm $e'$ of the latter lever is the upper end of a rod X, the lower end of this rod being adjustably connected to another lever Y fulcrumed to a bracket Z adjustable in guides $f'$ on the standard B, said bracket being held in its adjusted position by a set-bolt and nut, as is usual in this class of machines. The bracket Z is provided with bearings for a spindle A' and loose on the upper end of this spindle is a chuck C', the lower portion of said spindle being screw-threaded and engaged by a collar D' that is linked to the bifurcated forward end of the lever Y. By the screw-threaded connection of the spindle A' and collar D', the former may be vertically adjusted independent of the bracket Z, and to facilitate this adjustment, said spindle is provided with a hand-wheel E', a set-screw $g'$ being passed through said collar to lock the spindle in its adjusted position. As shown, I prefer to have an arm F' fast on the chuck-spindle A' and connected to this arm is a rod G' joined by a spring $h'$ with one arm of a bell-crank lever H' fulcrumed to the casting B', the other arm of the bell-crank lever being controlled by a spring $i'$, that unites it to said casting, the throw of said lever being limited by a set-screw $j'$. The latter arm of the bell-crank lever is provided with an opening $k'$ beveled on one side, as shown in Fig. 1, to permit the passage of a beveled lug $m'$ on the upper portion of the rod G', the latter being drawn over by the spring $h'$ to cause said lug to normally rest upon said arm of the bell-crank lever. At its lower end the bell-crank lever H' is provided with a bore $n'$ for an arm I' that has a curved finger J' pivoted thereto, the arm being adjustably held in the sleeve by a set-screw $o'$. In practice the curved finger J' of the arm I' serves as a means for centering the vessel on the chuck C' as well as an ejector for said vessel when the work thereon is completed, this being of especial advantage when an automatic feeding device, to be hereinafter described, is employed in connection with the machine.

Bolted to the under side of the head Q is a recessed plate K' having a beveled central opening corresponding to that of said head, and the recessed portion of the plate is cut away at $p'$ to form an entrance way for vessel-covers automatically fed to the machine by a mechanism to be now described.

Bolted to one of the bearings for the sleeve K is a bracket L' that supports a flanged plate M' having depending braces $q'$, and adjustably connected to these braces is another plate N', the latter plate serving as a track for the vessel bodies. A plate O' connected to the flanges of the plate M', parallel to the latter, serves as a track for the covers of the vessels, and said flanges are provided with bearings for transverse shafts P' Q' provided at one end with lever-arms $r'$ $s'$ connected by a link $t'$, and fast on the shaft Q' is one end of a spiral spring $u'$, the other end of the latter being secured to or rested against a lug $v'$ on one of the braces $q'$ as illustrated in Fig. 15. The shafts P' Q' are also provided with hook-shaped detaining fingers $w'$ $x'$ for the vessel bodies and covers on the tracks above described, and fast to one of the braces $q'$ is a guide for a spring-controlled trip R' pivotally connected to an extension S' of the arm F' fast on the chuck-spindle A', said trip being arranged to actuate the lever-arm $r'$ on the shaft P' and thereby move the latter and the one Q' to lift the fingers $w'$ $x'$ at predetermined intervals, these fingers being automatically returned to their normal position by the power of the spring $u'$ on the latter shaft.

By having those parts of the machine above the base-socket $b$ at an inclination, a vessel body and cover will be fed to the chuck $C'$ and plate $K'$ every time the trip $R'$ is actuated to raise the fingers $w'$, $x'$, and the automatic return of these fingers will detain the succeeding body and cover while the operation of seaming the former body and cover is taking place.

The machine shown is organized to double seam end-pieces to unflanged vessel bodies, and for this work the head Q is provided with a beveled entrance way 1 for a vessel and cover, a turning down face 2 for the flange of said cover, a die 3 to receive the flange of the tool N, a die 4 for partially turning down the three folds of the metal laid over at an angle to the vessel by the previous action of said tool with relation to the former die, a face 5 for completing the turning down of said folds and a recess 6 to receive said flange of the tool when the latter is actuated to forcibly oppose the face 5 at the completion of the seam.

In the general operation of the machine, the starting lever G is drawn out to set said machine in motion, as above described, the cam-wheel P, lever W, rod X and lever Y actuate the chuck spindle $A'$ and the vessel body and cover previously delivered to the machine from the feeding-mechanism are raised up into the revolving-head Q against the tool N, the cam-controlled mechanism being timed to continue this upward movement at predetermined intervals. The continued upward movement of the vessel will cause the flange of the cover to be laid down against the wall of said vessel by the pressure of the face 2 in the seaming head and thus a single seam is formed, the cam-wheel P being timed to temporarily discontinue said upward movement when the single seam is projected above said face, the completion of this stage of the operation being illustrated by Fig. 9. Up to the present time the tool N has been held on center against the vessel-cover by a rise on the cam-wheel V acting with relation to the spring-controlled rack-gear above described, but when the vessel is in the position shown by Fig. 9, a depression in said cam-wheel permits the spring U to act and thus actuate the lever T and by means of said rack-gear cause a partial rotation of the spindle M whereby said tool is carried out of center to thereby enter the die 3 in the head Q, and this movement being opposed to the single seam, previously formed, the latter is laid over at a right angle, as shown in Fig. 10. Another rise on the cam-wheel V actuates the rack-gear against the power of the spring U and the tool N is again centered by a reverse movement of the spindle M, after which the cam-wheel P and the mechanism controlled thereby acts to continue the upward movement of the vessel, the die 4 and face 5 in the head Q acting to turn down the several folds of metal and thereby form a double-seam, the latter in this instance being forced in against said tool to be flush with the wall of said vessel as shown in Fig. 12, this being a very desirable construction with relation to filled vessels closed on the machine, because of its obvious advantage when slip-covers are employed on such vessels. At this stage of the operation the upward movement of the vessel is again suspended and the spindle M partially rotated to carry the tool N out of center and compress the double seam, the flange of said tool being received by the recess 6 in said head, as is also shown in Fig. 12. The tool N is returned to center as above described and the cam actuated lever mechanisms are timed to cause a downward movement of said tool and the chuck $C'$ to bring the vessel out of the seaming-head. When the vessel is clear of the seaming-head the rod $G'$ is automatically actuated to swing the bell-crank $H'$ and thereby operate the arm $I'$ having the curved finger $J'$, this movement serving to discharge said vessel from its supporting chuck. The finished vessel being discharged from the machine, the trip $R'$ is automatically actuated to raise the fingers $w'$ $x'$, and another vessel-body and cover are fed to the machine, the entire operation as above described taking place during the time the shaft E is making one revolution. When the shaft E completes its revolution the clutch F is disengaged from the hub of pulley C, the brake H set on the wheel I and the starting lever returned to its normal position. It being understood that interchangeable heads suitable to the contour and size of the vessels, as well as the work to be done thereon, are employed.

While I have described the machine as organized for double-seaming, it may be organized to single-seam, crimp, fold, squeeze, form, burr, stamp end and various other operations in the art of working sheet-metal in either circular or angular forms, the only difference being in the formation of the head Q, tool N and timed mechanisms.

While I have shown a head adapted to work seams such as set forth in my patent No. 272,500 of February 20, 1883, said head may be substituted by one adapted to work seams on vessels first provided with a laterally projecting flange.

Having thus described my invention, what I claim as new, and desire to secure by Letters Patent, is—

1. In a machine for working sheet-metal, a hollow head having its inner wall configured to accord with an operation to be performed, a device arranged within the head and having normally the same axis as the latter, and suitable mechanism for establishing an eccentricity between said head and device, whereby they are brought into forcible contact against interposed material, substantially as set forth.

2. In a machine for working sheet-metal, a hollow head having its inner wall configured to accord with an operation to be performed, and an eccentrically oscillated pressure-device carried within the head and having normally the same axis as the latter, substantially as set forth.

3. In a machine for working sheet-metal, a hollow head having its inner wall configured to accord with an operation to be performed, a longitudinally reciprocating device carried within the head to exert pressure in one direction of its travel and having normally the same axis as the latter, and suitable mechanism for establishing an eccentricity between said head and device, substantially as set forth.

4. In a machine for working sheet-metal, a hollow head having its inner wall configured to accord with the operation to be performed, and a longitudinally reciprocating and laterally oscillating pressure device within the head in opposition to the metal, substantially as set forth.

5. In a machine for working sheet-metal, a hollow head having its inner wall configured to accord with the operation to be performed, a pressure device arranged within the head normally on center therewith, suitable means for establishing eccentricity between said head and pressure device, and suitable mechanism for feeding the work to the machine, substantially as set forth.

6. In a machine for working sheet-metal, a hollow head having its inner wall configured to accord with a seaming-operation, a cover-supporting device carried with the head, a seaming-tool arranged within said head in opposition to the inner wall thereof, and suitable mechanism for engaging a vessel-body and supported cover and for bringing the parts thus engaged between said wall and seaming-tool, as well as for exerting lateral pressure between this wall and tool against interposed metal, substantially as set forth.

7. In a machine for working sheet-metal, a hollow head having its inner wall configured to accord with a double-seaming operation, a cover-supporting device carried with the head, a seaming-tool arranged within said head in opposition to the inner wall thereof, and suitable mechanism for engaging a vessel-body and supported cover and for bringing the parts thus engaged between said wall and seaming-tool, as well as for exerting intermittent lateral pressure between this wall and tool against interposed metal, substantially as set forth.

8. In a machine for working sheet-metal, a head having an inner wall configured to accord with the operation to be performed, a sleeve having an axis corresponding to that of the head and provided with an eccentric bore, a spindle arranged within the bore, a tool eccentrically connected to the spindle, and a mechanical-movement for effecting a rotary adjustment with relation to the head and tool, substantially as set forth.

9. In a machine for working sheet-metal, a head having an inner wall configured to accord with the operation to be performed, a sleeve arranged with relation to the head and provided with an eccentric bore, a longitudinally adjustable spindle arranged within said bore, a tool eccentrically connected to the spindle, and a mechanical movement for effecting a rotary adjustment with relation to the head and tool, substantially as set forth.

10. In a machine for working sheet-metal, a head having an inner wall configured to accord with the operation to be performed, a rotary adjustable sleeve arranged with relation to the head and provided with an eccentric bore, a spindle arranged within said bore, a tool eccentrically connected to the spindle, and a mechanical-movement for effecting a rotary adjustment with relation to the head and tool, substantially as set forth.

11. In a machine for working sheet-metal, a head having an inner wall configured to accord with the operation to be performed, a sleeve having an axis corresponding to that of the head and provided with an eccentric bore, a spindle arranged within said bore, a tool having a shank detachably connected to the spindle eccentric to the axis of the latter and a mechanical-movement for effecting a rotary adjustment with relation to the head and tool, substantially as set forth.

12. In a machine for working sheet-metal, a head having an inner wall configured to accord with the operation to be performed, a sleeve having an axis corresponding to that of the head and provided with an eccentric bore, a spindle arranged within said bore and provided with an eccentric socket, a tool having its shank inserted in said socket, a retaining device connecting the shank and spindle, and a mechanical-movement for effecting a rotary adjustment with relation to the head and tool, substantially as set forth.

13. In a machine for working sheet-metal, a head having an inner wall configured to accord with the operation to be performed, a sleeve axially extended from the head, another sleeve arranged within the first and provided with an eccentric bore, a spindle arranged within said bore, a tool eccentrically connected to the spindle, and a mechanical-movement for effecting a rotary adjustment with relation to the head and tool, substantially as set forth.

14. In a machine for working sheet-metal, a seaming-mechanism, a feed-mechanism for vessel-bodies and covers, and an arm provided with a pivoted centering-finger opposed to the vessel-bodies beyond the point at which they leave the feed-mechanism, substantially as set forth.

15. In a machine for working sheet-metal, a seaming-mechanism, a feed-mechanism for vessel-bodies and covers, and an adjustable arm provided with a pivoted centering-finger opposed to the vessel bodies beyond the point at which they leave the feed-mechanism, substantially as set forth.

16. In a machine for working sheet-metal, a seaming-mechanism, a feed-mechanism for vessel-bodies and covers, and a lever-controlled arm provided with a centering and ejecting device opposed to the vessel-bodies beyond the point at which they leave the feed-mechanism, substantially as set forth.

17. In a machine for working sheet-metal, a seaming-mechanism, a feed-mechanism for vessel-bodies and covers, and a centering and ejecting device comprising a spring-controlled lever, an arm connected thereto, a finger pivoted to the arm in opposition to the vessel-bodies as they leave the machine; and suitable mechanism for actuating the lever at predetermined intervals, substantially as set forth.

18. In a machine for working sheet-metal, a hollow head having an inner wall provided with a succession of dies and faces, a tool arranged within the head and having normally the same axis as the latter, and suitable means for establishing an eccentricity between said head and tool and for exerting rotary pressure at the same time, substantially as set forth.

19. In a machine for working sheet-metal, a hollow head having its inner wall configured to accord with an operation to be performed, a pressure-device arranged within the head and having normally the same axis as the latter, a chuck opposed to said head, and suitable mechanism for establishing eccentricity between the head and pressure-device as well as for varying the distance between the chuck and aforesaid head at such intervals as the work may require, substantially as set forth.

20. In a machine for working sheet-metal, a hollow head having an inner wall configured to accord with successive stages of an operation to be performed, a laterally oscillating pressure-device arranged within the head and having normally the same axis as the latter, a chuck opposed to said head, and suitable mechanism for varying the distance between the chuck and aforesaid head at such intervals as the work may require, substantially as set forth.

21. In a machine for working sheet-metal, a hollow head having its wall configured to accord with successive stages of an operation to be performed, a longitudinally reciprocative pressure-device arranged within the head and having the same axis as the latter, a chuck opposed to said head, and suitable mechanism for establishing an eccentricity between the head and pressure device as well as for varying the distance between the chuck and aforesaid head at such intervals as the work may require, substantially as set forth.

22. In a machine for working sheet-metal, a head having an inner wall configured to conform with successive stages of the operation to be performed, a longitudinally reciprocating and laterally oscillating pressure-device arranged within the head a chuck opposed to this head, and a mechanical movement for varying the distance between said head and chuck at such intervals as the work may require, substantially as set forth.

23. In a machine for working sheet-metal, a feeding-device that comprises inclined tracks for vessel-bodies and covers, shafts loose in bearings and provided with stops normally in the path of said bodies and covers, an arm on each shaft, a link connecting the arms, and a tripping-device for engagement with one of said arms, substantially as set forth.

24. In a machine for working sheet-metal, a feeding-device that comprises inclined tracks for vessel-bodies and covers, shafts loose in bearings and provided with stops normally arranged in the path of said bodies and covers, an arm on each shaft, a link connecting the arms, and a spring-controlled trip for engagement with one of said arms, substantially as set forth.

25. In a machine for working sheet-metal, a feeding-device for vessel bodies and covers that comprises a flanged plate having depending braces, another plate adjustably connected to the braces, still another plate connected to the flanges of the first parallel to the same, stops arranged to come in the path of the bodies and covers, and a timed-mechanism for withdrawing the stops, substantially as set forth.

26. In a machine for working sheet-metal, a shaft, a wheel fast thereon, a brake for the wheel, a sliding lever provided with means for releasing the brake, and a timed-mechanism for returning the lever to its normal position, substantially as set forth.

27. In a machine for working sheet-metal, a shaft provided with a pulley normally loose thereon, a wheel fast on the shaft, a clutch for the pulley, a brake for the wheel, a sliding lever provided with means for operating the clutch and releasing the brake, and a time-mechanism for returning the lever to its normal position, substantially as set forth.

28. In a machine for working sheet-metal, a hollow seaming-head having its inner wall provided with a beveled surface 1, face 2, dies 3 and 4 and face 5, a tool having normally the same axis as the head and arranged in opposition to said wall, and suitable mechanism for exerting movement and establishing eccentricity with relation to the head and tool at various intervals, substantially as set forth.

29. In a machine for working sheet-metal a hollow seaming-head having its inner wall provided with a beveled surface 1, face 2, dies 3 and 4, face 5 and recess 6, a flanged tool having normally the same axis as the head and arranged in opposition to said wall, and suitable mechanism for exerting movement and establishing eccentricity with relation to the tool and head at various intervals, substantially as set forth.

30. In a machine for working sheet-metal, a mechanism organized for a certain operation, a chuck opposed to said mechanism, a two faced cam-wheel, a lever-mechanism connected to the chuck and opposed to one face of the cam-wheel, and an ejector mechanism provided with a lever-arm opposed to the other face of said cam-wheel, substantially as set forth.

31. In a machine for working sheet-metal, a mechanism organized for a certain operation, a reciprocating chuck opposed to said mechanism, a feeding-device, a stop-mechanism for material on the feeding-device, and a trip for the stop-mechanism connected to the spindle of said chuck, substantially as set forth.

32. In a machine for working sheet-metal, a mechanism organized for a certain operation, a reciprocating chuck opposed to said mechanism, a lever-controlled arm provided with a centering and ejector-finger, a feeding-device, a stop-mechanism for material on the feeding-device, and trips for the lever-controlled arm and stop-mechanism connected to the spindle of said chuck, substantially as set forth.

33. In a machine for uniting and flanging combined straight wall sheet-metal bodies and countersunk covers, the combination of a support for such a body, a chuck provided with a lateral flange, and a surface having a plane parallel to the chuck-flange, but normally disengaged therefrom, suitable means for establishing the support, chuck and surface in such relative position that the three thicknesses of metal, due to the engagement of the body and cover, are interposed between said chuck and surface; and other suitable means for engaging the chuck-flange and surface against the united body and cover by a movement of said chuck at right angles to said vessel-body coincident with a rotation of at least one of the opposing devices relative to said axis, substantially as set forth.

34. In a machine for working sheet-metal, a cam-actuated lever, a tool-carrying spindle, a shackle pivotally connected to the lever, an adjusting-screw connecting the spindle and shackle, and a lock-nut on said screw, substantially as set forth.

35. In a machine for working sheet-metal, a head having a series of dies and faces arranged in successive order, a tool operating in conjunction with the head, and suitable means for successively bringing this tool in and out of engagement with said dies against interposed metal, whereby the latter is flanged, folded and compressed by a continuous operation in successive steps, according to the configuration of the opposing head, substantially as set forth.

36. In a machine for working sheet-metal, a series of dies and faces arranged in successive order, a tool operating in conjunction with the dies, and suitable means for successively bringing this tool in and out of engagement with said dies against interposed metal, as well as for ejecting the finished work, substantially as set forth.

37. In a machine for working sheet-metal, a hollow head provided with a device for retaining a cover therein prior to the engagement of the cover with a body, a chuck for the support of the body, a double seaming-mechanism within the head, and suitable means for causing an approach of the head and chuck toward each other whereby said cover and body are brought into engagement and subsequently seamed together, substantially as set forth.

38. In a machine for working sheet-metal a chuck having a depth approximately equal to that of a counter-sunk vessel-cover, a turning-down surface for the cover-flange opposed to the wall of the chuck, a flanging-surface at an angle to the axis of said chuck, and suitable means for exerting pressure between the aforesaid chuck and surfaces, against the metal at successive intervals, substantially as set forth.

39. In a machine for working sheet-metal, a chuck having a depth approximately equal to that of a countersunk vessel-cover, a turning-down surface for the cover-flange opposed to the wall of the chuck, a flanging-surface at an angle to the axis of said chuck, a folding-surface succeeding the flanging surface, and suitable means for exerting pressure between the aforesaid chuck and surfaces against the metal at successive intervals, substantially as set forth.

40. In a machine for working sheet-metal, a chuck having a depth approximately equal to that of a countersunk vessel-cover and provided with a flange approximately equal to the diameter of said cover, a turning-down surface for the cover-flange opposed to the wall of the chuck, a flanging surface at an angle to the axis of said chuck, a folding surface succeeding the flanging surface, and suitable means for exerting pressure between the aforesaid chuck and surfaces against the metal at successive intervals, substantially as set forth.

In testimony that I claim the foregoing I have hereunto set my hand, at Milwaukee, in the county of Milwaukee and State of Wisconsin, in the presence of two witnesses.

FRANCIS A. WALSH.

Witnesses:
N. E. OLIPHANT,
WM. KLUG.